United States Patent
Morioka et al.

(10) Patent No.: US 10,358,980 B2
(45) Date of Patent: Jul. 23, 2019

(54) FUEL SUPPLY APPARATUS FOR AIRCRAFT ENGINE

(71) Applicant: IHI Corporation, Koto-ku (JP)

(72) Inventors: Noriko Morioka, Tokyo (JP); Hitoshi Oyori, Tokyo (JP)

(73) Assignee: IHI Corporation, Koto-ku (JP)

( * ) Notice: Subject to any disclaimer, the term of this patent is extended or adjusted under 35 U.S.C. 154(b) by 649 days.

(21) Appl. No.: 15/050,800

(22) Filed: Feb. 23, 2016

(65) Prior Publication Data

US 2016/0169112 A1    Jun. 16, 2016

Related U.S. Application Data

(63) Continuation of application No. PCT/JP2014/071496, filed on Aug. 15, 2014.

(30) Foreign Application Priority Data

Aug. 30, 2013  (JP) ................... 2013-179226

(51) Int. Cl.
*F02C 7/236* (2006.01)
*B64D 37/14* (2006.01)
(Continued)

(52) U.S. Cl.
CPC ............ *F02C 7/236* (2013.01); *B64C 11/305* (2013.01); *B64C 17/10* (2013.01); *B64D 37/04* (2013.01);
(Continued)

(58) Field of Classification Search
CPC ....... B64C 11/305; B64C 17/10; B64D 37/14; F02C 7/22; F02C 7/222; F02C 7/236; F05D 2260/601
(Continued)

(56) References Cited

U.S. PATENT DOCUMENTS

| | | | | |
|---|---|---|---|---|
| 2,440,262 A | * | 4/1948 | Grey | B64D 37/005 |
| | | | | 137/255 |
| 2,516,150 A | * | 7/1950 | Samiran | B64D 37/005 |
| | | | | 137/208 |

(Continued)

FOREIGN PATENT DOCUMENTS

| EP | 2 541 024 A2 | 1/2013 |
|---|---|---|
| JP | 2003-113751 | 4/2003 |

(Continued)

OTHER PUBLICATIONS

Royce, Rolls. (2015). Jet Engine (5th Edition). John Wiley & Sons. pp. 175-179. Retrieved from https://app.knovel.com/hotlink/toc/id:kpJEE00001/jet-engine-5th-edition/jet-engine-5th-edition (Year: 2015).*

(Continued)

*Primary Examiner* — Gerald L Sung
*Assistant Examiner* — Marc J Amar
(74) *Attorney, Agent, or Firm* — Oblon, McClelland, Maier & Neustadt, L.L.P.

(57) ABSTRACT

Two systems of a first pump unit and a third pump unit that supply fuel of a fuselage fuel tank, and a second pump unit and a fourth pump unit that supply fuel of fuel tanks in both right and left wings are provided corresponding to a left-wing engine and a right-wing engine, respectively. A supply source of the fuel to be supplied to the left-wing engine or the right-wing engine is switched by switching of the pump unit to be turned on.

3 Claims, 6 Drawing Sheets

(51) Int. Cl.
  F02C 7/22    (2006.01)
  B64C 11/30   (2006.01)
  B64C 17/10   (2006.01)
  B64D 37/04   (2006.01)
  B64D 37/20   (2006.01)
  F02C 7/228   (2006.01)
  F02C 9/42    (2006.01)
  F04D 13/06   (2006.01)

(52) U.S. Cl.
  CPC ............ *B64D 37/14* (2013.01); *B64D 37/20* (2013.01); *F02C 7/22* (2013.01); *F02C 7/222* (2013.01); *F02C 7/228* (2013.01); *F02C 9/42* (2013.01); *F04D 13/06* (2013.01); *F05D 2260/601* (2013.01)

(58) Field of Classification Search
  USPC ................. 244/135 R, 135 C; 137/255–267, 137/386–454
  See application file for complete search history.

(56) References Cited

U.S. PATENT DOCUMENTS

| | | | | |
|---|---|---|---|---|
| 2,580,467 A * | 1/1952 | Samiran | ................. | B64D 37/20 137/101.27 |
| 3,319,570 A * | 5/1967 | Norris | .................... | B64D 37/20 417/163 |
| 3,419,233 A * | 12/1968 | Wotton | ................. | B64D 37/14 244/135 R |
| 3,511,259 A | 5/1970 | Touré | | |
| 3,627,239 A | 12/1971 | Hull, Jr. | | |
| 4,591,115 A * | 5/1986 | DeCarlo | ................. | B64C 17/10 137/255 |
| 4,932,609 A * | 6/1990 | Secchiaroli | ............. | B64C 17/10 137/256 |
| 5,321,945 A * | 6/1994 | Bell | .......................... | F02C 7/22 244/135 C |
| 5,555,873 A * | 9/1996 | Nolen | ................ | F02M 37/0064 123/575 |
| 5,660,358 A * | 8/1997 | Grafwallner | ........... | B64D 37/14 137/565.17 |
| 6,125,882 A * | 10/2000 | Kong | ...................... | B64C 17/10 137/213 |
| 6,126,111 A * | 10/2000 | Burcham, Jr. | .......... | B64C 17/10 244/135 C |
| 7,591,277 B2 | 9/2009 | Johnson et al. | | |
| 9,205,913 B2 * | 12/2015 | van der Westhuizen | .................... | B64C 17/10 |
| 2003/0218098 A1 * | 11/2003 | Goto | ..................... | B64D 37/08 244/135 R |
| 2006/0278761 A1 * | 12/2006 | Cutler | .................... | B64D 39/00 244/135 A |
| 2007/0084511 A1 * | 4/2007 | Johnson | .................. | B64C 17/10 137/265 |
| 2007/0130911 A1 * | 6/2007 | Goldberg | .................. | F02C 7/22 60/39.281 |
| 2010/0018182 A1 * | 1/2010 | Bader | ..................... | F02C 7/236 60/39.281 |
| 2010/0044515 A1 | 2/2010 | Neto | | |

FOREIGN PATENT DOCUMENTS

| | | |
|---|---|---|
| JP | 2010-506795 | 3/2010 |
| JP | 2013-32707 | 2/2013 |
| WO | WO 2008/048267 A1 | 4/2008 |

OTHER PUBLICATIONS

Kundu, Ajoy Kumar. (2010). Aircraft Design—15.9.2 Engine and Fuel Control Subsystems. Cambridge University Press. pp. 505-508. Retrieved from https://app.knovel.com/hotlink/pdf/id:kt008N97S9/aircraft-design/engine-fuel-control-subsystems (Year: 2010).*
Extended Search Report dated Apr. 25, 2017 in European Patent Application No. 14839879.5.
International Search report dated Nov. 18, 2014 in PCT/JP2014/071496, filed Aug. 15, 2014 ( with English Translation).
Written Opinion dated Nov. 11, 2014 in PCT/JP2014/071496, filed Aug. 15, 2014.

* cited by examiner

FUEL SUPPLY APPARATUS FOR AIRCRAFT ENGINE

CROSS REFERENCE TO RELATED APPLICATIONS

This application is a continuation application of International Application No. PCT/JP2014/072496, filed on Aug. 15, 2014, which claims priority to Japanese Patent Application No. 2013-179226, filed on Aug. 30, 2013, the entire contents of which are incorporated by reference herein.

BACKGROUND

1. Technical Field

The present disclosure relates to an apparatus that supplies fuel to an aircraft engine.

2. Description of the Related Art

When fuel tanks are provided in a fuselage and both wings of an aircraft, respectively, fuel of a fuselage fuel tank is first consumed from viewpoints of safety at the time of landing and weight balance of an airframe in consideration of fuel consumption. Accordingly, when engines are provided in both wings, respectively, each of the engines consumes fuel supplied from the fuselage fuel tank at first. Additionally, when the fuselage fuel tank becomes empty, a left-wing engine consumes fuel from a left-wing fuel tank, and a right-wing engine consumes fuel from a right-wing fuel tank, respectively.

Additionally, when variation occurs in remaining fuel amounts of the fuel tanks in the both wings, fuel is transferred from the fuselage fuel tank or one wing fuel tank with a large remaining fuel amount to the other wing fuel tank with a small remaining fuel amount, and the remaining fuel amounts of the fuel tanks in the both wings are equalized (refer to U.S. Pat. No. 7,591,277).

SUMMARY

As mentioned above, when the fuel tank of a fuel supply source is switched, opening and closing of a path switching valve is performed in addition to turning on and off of a boost pump of each fuel supply path before and after the switching. In addition, also when the fuel is transferred between the fuel tanks, turning on and off of a transfer pump on a fuel transfer path, and opening and closing of a valve are performed. These are performed by manual operation of a pilot based on his/her judgment. For this reason, a burden on the pilot in relation to the switching of the fuel supply path is significantly large.

In addition, since the boost pump for fuel supply to the engine cannot be used as the transfer pump for fuel transfer between the fuel tanks, and thus the transfer pump is provided specifically for the fuel transfer, extra time and effort of maintenance is required for the transfer pump.

An object of the present disclosure is to provide an aircraft engine fuel supply apparatus that can achieve consuming fuel of fuel tanks in a fuselage and both wings in order or equalizing fuel consumption of the fuel tanks in the both wings by simple configuration and operation in an aircraft in which fuel tanks are provided in a fuselage and both wings, respectively.

One aspect of the present disclosure is a fuel supply apparatus for an aircraft engine, the apparatus including: a first pump unit configured to supply fuel from a fuselage fuel tank of an aircraft to a first engine provided in a left wing of the aircraft; a second pump unit configured to supply fuel from fuel tanks in both wings of the aircraft to the first engine; a third pump unit configured to supply the fuel from the fuselage fuel tank to a second engine provided in a right wing of the aircraft; a fourth pump unit configured to supply the fuel from the fuel tanks in the both wings to the second engine; and a switching unit configured to selectively switch the pump units that supply the fuel to the each engine, respectively, wherein the each pump unit has: a booster and a measuring unit; the booster includes: a centrifugal pump and a gear pump configured to boost and supply fuel to the corresponding engine, and an electric motor configured to rotationally drives the centrifugal pump and the gear pump; and the measuring unit is configured to measure a supply amount of the fuel to the corresponding engine.

The fuel supply apparatus may further include:

a first ejector pump configured to supply fuel in a fuel supply path from the fuselage fuel tank to the first pump unit to a fuel supply path from the fuel tanks in the both wings to the second pump unit utilizing a boost pressure of the fuel by the centrifugal pump of the third pump unit, when the fuel is supplied from the second pump unit to the left-wing engine, and the fuel is supplied from the third pump unit to the right-wing engine; and a second ejector pump configured to supply fuel in a fuel supply path from the fuselage fuel tank to the third pump unit to a fuel supply path from the fuel tanks in the both wings to the fourth pump unit utilizing a boost pressure of the fuel by the centrifugal pump of the first pump unit, when the fuel is supplied from the fourth pump unit to the right-wing engine, and the fuel is supplied from the first pump unit to the left-wing engine.

According to the present disclosure, it can be achieved by simple configuration and operation to consume the fuel of fuel tanks in the fuselage and the both wings in order, and to equalize fuel consumption of the fuel tanks in the both wings, in the aircraft in which the fuel tanks are provided in the fuselage and the both wings, respectively.

DESCRIPTION OF THE EMBODIMENTS

Hereinafter, an embodiment of the present disclosure will be explained with reference to drawings. A fuel supply apparatus 1 of the embodiment shown in an explanatory diagram of FIG. 1 supplies fuel from fuel tanks 3a to 3c in the fuselage and both wings togas turbine engines (hereinafter abbreviated as "engines") 5a and 5b in the both wings in an aircraft that is not shown. The fuel supply apparatus 1 has: first to fourth pump units 7a to 7d that boost and pressurize fuel of the fuel tanks 3a to 3c, and supply it to the engines 5a and 5b; and an aircraft digital control device (an airframe computer, such as a flight computer) 15 on an airframe side that controls operations of the respective pump units 7a to 7d.

Figure 1:
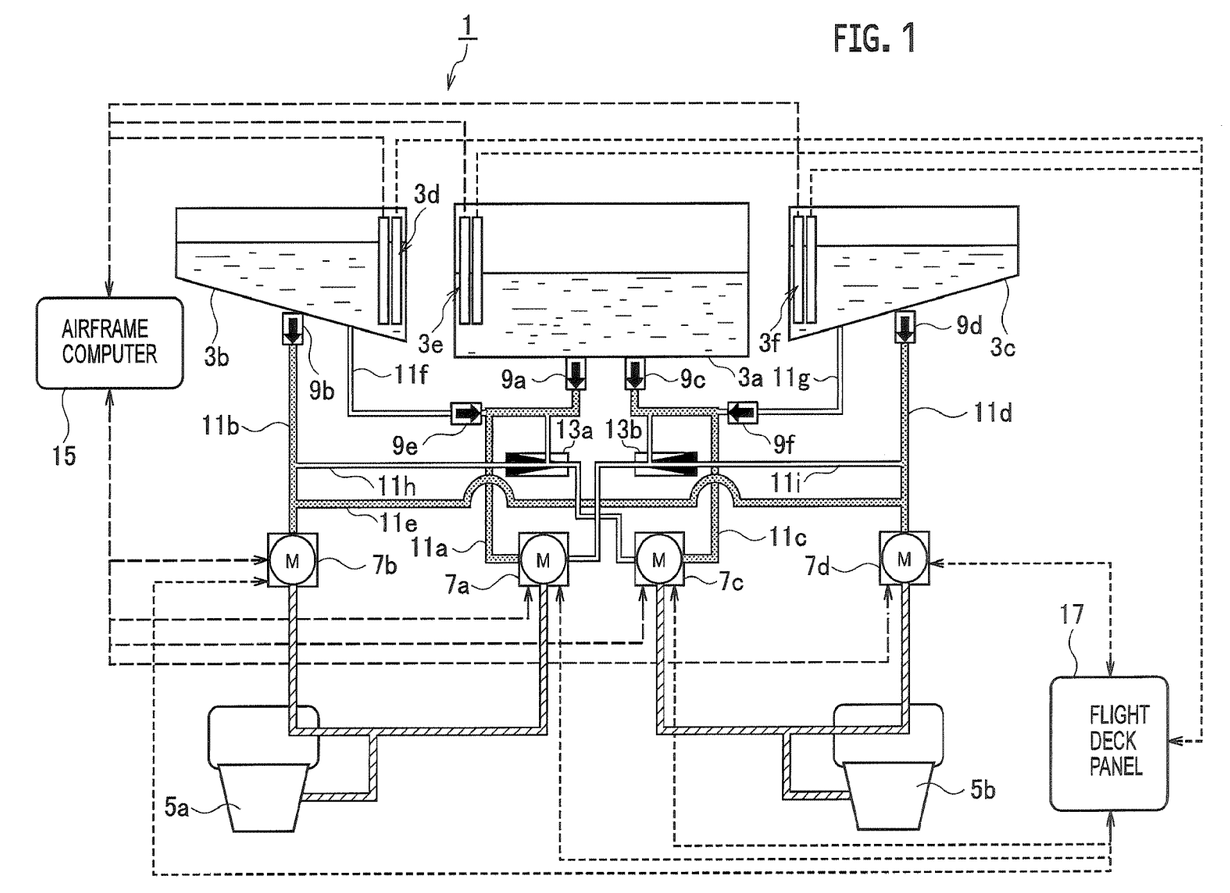
FIG. 1 is an explanatory diagram showing a fuel supply apparatus for an aircraft engine according to an embodiment of the present disclosure.

Remaining fuel amounts of the respective fuel tanks 3a to 3c are detected by sensors 3d to 3f. The detected remaining fuel amounts of the respective fuel tanks 3a to 3c are notified to the airframe computer 15, and also displayed on a flight deck panel 17 of a cockpit. Operation states of the first to fourth pump units 7a to 7d are also displayed on the flight deck panel 17.

The first pump unit 7a and the second pump unit 7b supply fuel to a left-wing engine (a first engine) 5a. The first pump unit 7a is connected to a check valve 9a of the fuselage fuel tank 3a by a left central fuel flow passage 11a. The second pump unit 7b is connected to a check valve 9b of the left-wing fuel tank 3b by a left main fuel flow passage 11b.

The third pump unit 7c and the fourth pump unit 7d supply fuel to a right-wing engine (a second engine) 5b. The third pump unit 7c is connected to a check valve 9c of the fuselage fuel tank 3a by a right central fuel flow passage 11c. The fourth pump unit 7d is connected to a check valve 9d of the right-wing fuel tank 3c by a right main fuel flow passage 11d.

The right and left main fuel flow passages 11b and 11d are connected to each other by a central communication flow passage 11e. As will be mentioned later, the central communication flow passage 11e enables flow of the fuel from the left main fuel flow passage 11b to the right main fuel flow passage 11d, and flow of the fuel from the right main fuel flow passage 11d to the left main fuel flow passage 11b. In other words, the central communication flow passage 11e makes it possible to supply the fuel of the left-wing fuel tank 3b to the fourth pump unit 7d, and to supply the fuel of the right-wing fuel tank 3c to the second pump unit 7b. The left central fuel flow passage 11a is connected to the left-wing fuel tank 3b through a check valve 9e and a left communication flow passage 11f. The right central fuel flow passage 11c is connected to the right-wing fuel tank 3c through a check valve 9f and a right communication flow passage 11g.

The left communication flow passage 11f is configured so that a pressure loss is higher than in the left central fuel flow passage 11a. Accordingly, while the fuel remains in the fuselage fuel tank 3a, the fuel from the fuselage fuel tank 3a is supplied to the first pump unit 7a in priority to the fuel from the left-wing fuel tank 3b. In order to make the pressure loss of the left communication flow passage 11f higher than that of the central fuel flow passage 11a, for example, a diameter of the left communication flow passage 11f may just be made smaller than a diameter of the central fuel flow passage 11a.

Similarly, the right communication flow passage 11g is configured so that a pressure loss is higher than in the right central fuel flow passage 11c. Accordingly, while fuel remains in the fuselage fuel tank 3a, the fuel from the fuselage fuel tank 3a is supplied to the third pump unit 7c in priority to the fuel from the right-wing fuel tank 3c.

A point closer to the fuselage fuel tank 3a than a connection point of the left communication flow passage 11f of the left central fuel flow passage 11a is connected to a suction port of a first ejector pump 13a. A boost pressure of the fuel by the third pump unit 7c is applied to a supply port of the first ejector pump 13a during an on-state of the third pump unit 7c. A discharge port of the first ejector pump 13a is connected to the left main fuel flow passage 11b through a left transfer flow passage 11h.

A point closer to the fuselage fuel tank 3a than a connection point of the right communication flow passage 11g of the right central fuel flow passage 11c is connected to a suction port of a second ejector pump 13b. A boost pressure of the fuel by the first pump unit 7a is applied to a supply port of the second ejector pump 13b during an on-state of the first pump unit 7a. A discharge port of the second ejector pump 13b is connected to the right main fuel flow passage 11d through a right transfer flow passage 11i.

Figure 2:
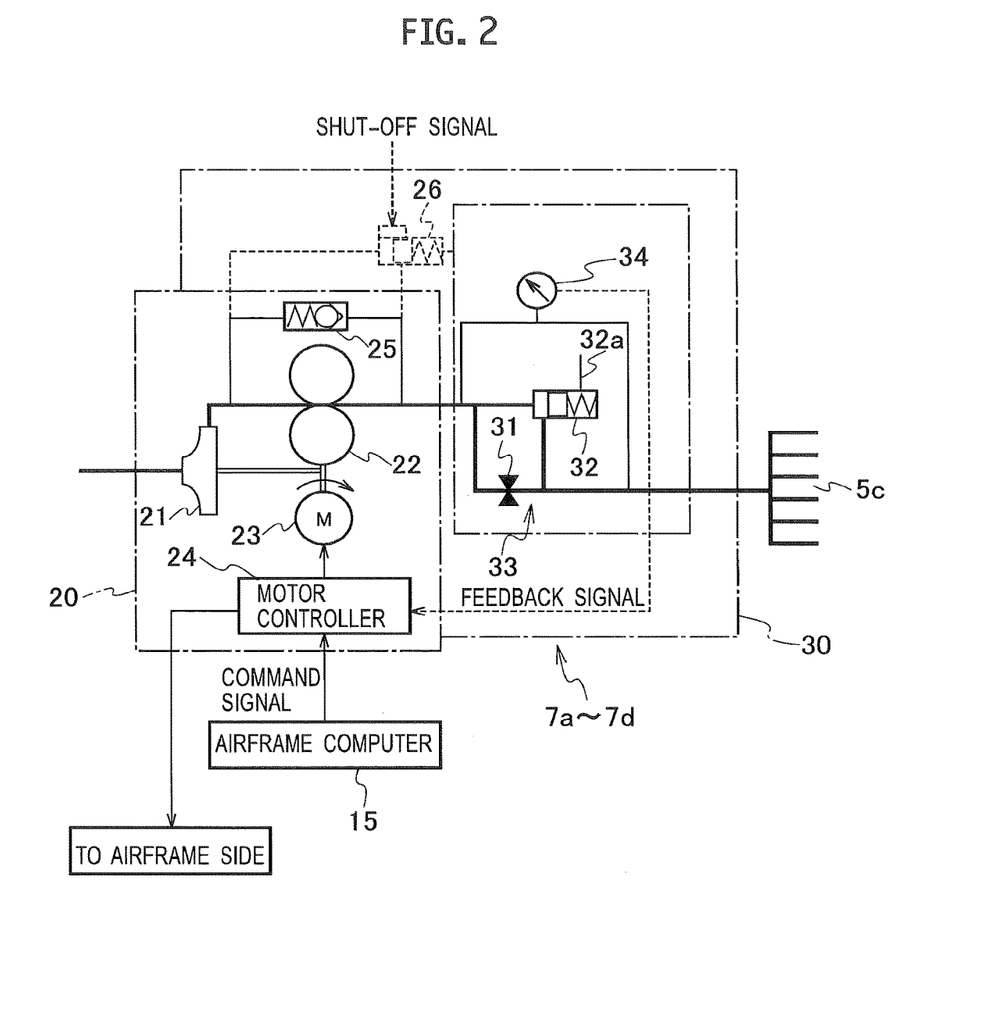
FIG. 2 is an explanatory diagram showing a schematic configuration of a pump unit of FIG. 1.

The first to fourth pump units 7a to 7d each have a booster 20 that boosts fuel supplied to a corresponding engine, and a measuring unit 30 that measures a supply amount of the fuel to the corresponding engine as shown in an explanatory diagram of FIG. 2.

The booster 20 has: a gear pump 22 that discharges fuel taken in from the fuel tanks 3a to 3c by a low-pressure pump (a centrifugal pump) 21 and boosted; an electric motor 23 that rotationally drives the low-pressure pump 21 and the gear pump 22; a motor controller 24 that controls the rotational speed of the electric motor 23; and a relief valve (a safety valve) 25 connected in parallel to the gear pump 22. The gear pump 22 is a well-known fixed displacement pump, and a discharge flow rate of the fuel by the gear pump 22 is proportional to the rotational speed of the gear pump 22.

The motor controller 24 has a memory (not shown). A profile indicating a correlation characteristic of the rotational speed of the gear pump 22 proportional to the rotational speed of the electric motor 23 and a discharge flow rate of the fuel (a profile of the rotational speed to flow rate characteristic) is stored in the memory. In addition, the motor controller 24 receives a fuel flow demand of the fuel from the airframe computer 15 by means of a command signal. Additionally, the motor controller 24 obtains from the profile the rotational speed of the gear pump 22 corresponding to the fuel flow demand, determines the rotational speed of the electric motor 23 for rotationally driving the gear pump 22 at the rotational speed, and controls the rotational speed of the electric motor 23 to be the determined rotational speed.

The measuring unit 30 has: a fixed orifice 31; a pressurizing valve 32 provided in parallel to the fixed orifice 31; and a differential pressure gauge 34 that measures a differential pressure between a front and a rear (an upstream side and a downstream side) of a parallel flow passage 33 of the fixed orifice 31 and the pressurizing valve 32.

The fixed orifice 31 has an orifice with a fixed flow passage cross-sectional area, and when a discharge flow rate of the fuel by the gear pump 22 exceeds a set value, the pressurizing valve 32 opens at a valve opening degree according to the discharge flow rate. Here, the set value means a flow rate of the fuel that passes through the fixed orifice 31. Accordingly, the flow rate of the fuel that passes through the parallel flow passage 33 becomes not more than a passing flow rate (the set value) of the fixed orifice 31 at the time of valve closing of the pressurizing valve 32, and it becomes a total value of the passing flow rate (the set value) of the fixed orifice 31 and a flow rate that passes through the pressurizing valve 32 at the time of valve opening of the pressurizing valve 32.

The passing flow rate (the set value) of the fixed orifice 31 is adjusted to a flow rate slightly exceeding a flow rate of the fuel needed at the time of ignition (at the time of engine start) of the respective left-wing and right-wing engines 5*a* and 5*b* each having a fuel nozzle 5*c*. For this reason, a fuel passing area in the parallel flow passage 33 is determined only by the fixed orifice 31 with good accuracy in a range in which a discharge flow rate of the fuel by the gear pump 22 is not less than the set value and less than a flow rate at which the pressurizing valve 32 opens. For this reason, the fuel of the flow amount at the time of ignition of the engines 5*a* and 5*b* that requires accuracy can be accurately supplied to the fuel nozzle 5*c*.

When fuel supply to the fuel nozzle 5*c* by the first to fourth pump units 7*a* to 7*d* is stopped (shut off), a shut-off valve 26 provided in parallel to the relief valve 25 of the booster 20 is opened by a shut-off signal output by a controller that is not shown based on the command signal from the airframe computer 15. As a result of this, the fuel supplied from the booster 20 to the measuring unit 30 is recirculated between the low-pressure pump 21 and the gear pump 22, and thereby the fuel supply to the fuel nozzle 5*c* can be stopped.

Further, stop (shut-off) of the fuel supply to the fuel nozzle 5*c* can be achieved also by stopping rotational drive of the gear pump 22 by the electric motor 23. However, since the gear pump 22 rotates due to inertia for a while even though the electric motor 23 is stopped, a small amount of fuel passes through the fixed orifice 31 until the rotation of the gear pump 22 stops even though the pressurizing valve 32 closes. Consequently, a drain passage 32*a* that communicates with an atmospheric pressure is provided in the pressurizing valve 32, the small amount of fuel that has passed through the fixed orifice 31 is made to flow through the drain passage 32*a* instead of the fuel nozzle 5*c* in a high-pressure state by rotation of the gas turbine engine and, for example, it may be made to return to the fuel tanks 3*a* to 3*c*.

The above-mentioned drain passage 32*a* is provided in the pressurizing valve 32, thereby a supply stop system of the fuel to the gas turbine engine is made to be redundant, and it can be used as a backup when malfunction occurs in a system of the shut-off valve 26 of the booster 20. In addition, the shut-off valve 26 may be omitted, and a shut-off system of the fuel may include only the drain passage 32*a*. Conversely, when the shut-off system of the fuel includes only the shut-off valve 26, the drain passage 32*a* of the pressurizing valve 32 may be omitted.

In the above-mentioned first to fourth pump units 7*a* to 7*d*, the differential pressure between the front and the rear (the upstream side and the downstream side) of the parallel flow passage 33 measured by the differential pressure gauge 34 is fed back to the motor controller 24. The motor controller 24 detects an actual flow rate of the fuel that passes through the parallel flow passage 33 from the differential pressure measured by the differential pressure gauge 34. Additionally, when the detected actual flow rate of the fuel does not coincide with the fuel flow demand by the command signal from the airframe computer 15 (except for non-coincidence within an allowable error range), the motor controller 24 updates the profile stored in the memory.

The profile to be updated can be obtained by multiplying a discharge flow rate of the fuel corresponding to the rotational speed of the gear pump 22 of the profile currently stored in the memory by a ratio of the actual flow rate of the fuel calculated by the motor controller 24 to the fuel flow demand. In addition, a plurality of sets of the rotational speed of the gear pump 22 and the actual flow rate of the fuel calculated from a measurement value of the differential pressure gauge 34 may be obtained, and the correlation characteristic of the rotational speed of the gear pump 22 and the discharge flow rate of the fuel may be obtained again.

When the profile is updated, after that, the rotational speed of the gear pump 22 corresponding to the fuel flow demand by the command signal from the airframe computer 15 is obtained from the updated profile by the motor controller 24, and the rotational speed of the electric motor 23 for rotationally driving the gear pump 22 at the obtained rotational speed is determined. The rotational speed of the electric motor 23 is then controlled to be the determined rotational speed by the motor controller 24.

As described above, the actual flow rate of the fuel is detected by the motor controller 24 in the first to fourth pump units 7*a* to 7*d*. Additionally, when the fuel flow demand and the actual flow rate of the fuel become non-coincident with each other, the motor controller 24 updates the profile, which has been stored in the memory, of the correlation characteristic of the rotational speed of the gear pump 22 and the discharge flow rate of the fuel. When the profile is then updated, the rotational speed of the electric motor 23 determined by the motor controller 24 changes corresponding to a same fuel flow demand.

Accordingly, for example, when the rotational speed to flow rate characteristic of the gear pump 22 changes due to aged deterioration etc., the change is grasped based on the actual flow rate of the fuel detected by the motor controller 24 from a measurement result of the differential pressure gauge 34, and the rotational speed of the gear pump 22 proportional to the rotational speed (a control value) of the electric motor 23 at that time.

In the first to fourth pump units 7*a* to 7*d*, the rotational speed of the gear pump 22 and the electric motor 23 corresponding to the fuel flow demand of the fuel is determined with reference to the profile of the correlation characteristic of the rotational speed of the gear pump 22 and the discharge flow rate of the fuel. For this reason, control for controlling the fuel supplied to the gas turbine engine to be the fuel flow demand is achieved by open-loop control that only updates the profile.

Namely, a fuel supply amount is controlled to be the fuel flow demand with a simple configuration without complicating a configuration of a control system as in a case of always adjusting the rotational speed of the gear pump 22 and the electric motor 23 by feedback control by a closed loop.

Note that maintenance information (a pump abnormality detecting signal) that promotes maintenance or exchange of the gear pump 22 may be output and provided to the airframe side (an outside), with having updated the profile being used as a trigger. In addition, coincidence/non-coincidence of the fuel flow demand and the actual flow rate, a gap thereof, etc. may be output and provided to the airframe side as pump performance trend information, regardless of the presence/absence of updating of the profile.

In addition, when the fuel flow demand of the fuel by the command signal from the airframe computer 15, and the actual flow rate of the fuel that passes through the parallel flow passage 33 detected from the differential pressure measured by the differential pressure gauge 34 become non-coincident with each other, feedback control by the closed loop may be performed. In that case, the motor controller 24 performs the feedback control so that the actual flow rate coincides with the fuel flow demand. Also thereby, the fuel supply amount to the gas turbine engine can be controlled to be the fuel flow demand with good accuracy.

The first to fourth pump units 7*a* to 7*d* configured as described above have a capability of measuring and supplying at least half fuel of a maximum flow rate consumed by the left-wing engine 5a or the right-wing engine 5b, respectively.

Additionally, in the fuel supply apparatus 1 of FIG. 1 using the above-mentioned first to fourth pump units 7a to 7d, the first to fourth pump units 7a to 7d are turned on and off by control performed by the airframe computer 15 based on operation by a pilot of a control panel not shown provided at the flight deck panel 17 performed, or by control automatically performed by the airframe computer 15 based on a detection result by the sensor etc.

In this case, one of the control by the airframe computer 15 based on the pilot's operation and the automatic control by the airframe computer 15 based on the detection result by the sensor etc., can be used as a backup. In that case, it is arbitrary which one is used as the backup. In addition, only either one control may be performed without providing the backup.

The airframe computer 15 of the embodiment functions also as a switching unit that selectively switches the pump units 7a to 7d that supply fuel to the respective engines 5a and 5b, respectively. For example, the first to fourth pump units 7a to 7d are all turned on at the time of takeoff when fuel consumption by the engines 5a and 5b in the both wings becomes a maximum as shown in FIG. 1.

Accordingly, fuel taken in from the fuselage fuel tank 3a through the left central fuel flow passage 11a by the first pump unit 7a, and fuel taken in from the fuel tanks 3b and 3c in the both wings through the right and left main fuel flow passages 11b and 11d and the central communication flow passage 11e by the second pump unit 7b are supplied to the left-wing engine 5a.

Meanwhile, fuel taken in from the fuselage fuel tank 3a through the right central fuel flow passage 11c by the third pump unit 7c, and fuel taken in from the fuel tanks 3b and 3c in the both wings through the right and left main fuel flow passages 11b and 11d and the central communication flow passage 11e by the fourth pump unit 7d are supplied to the right-wing engine 5b.

Figure 3:
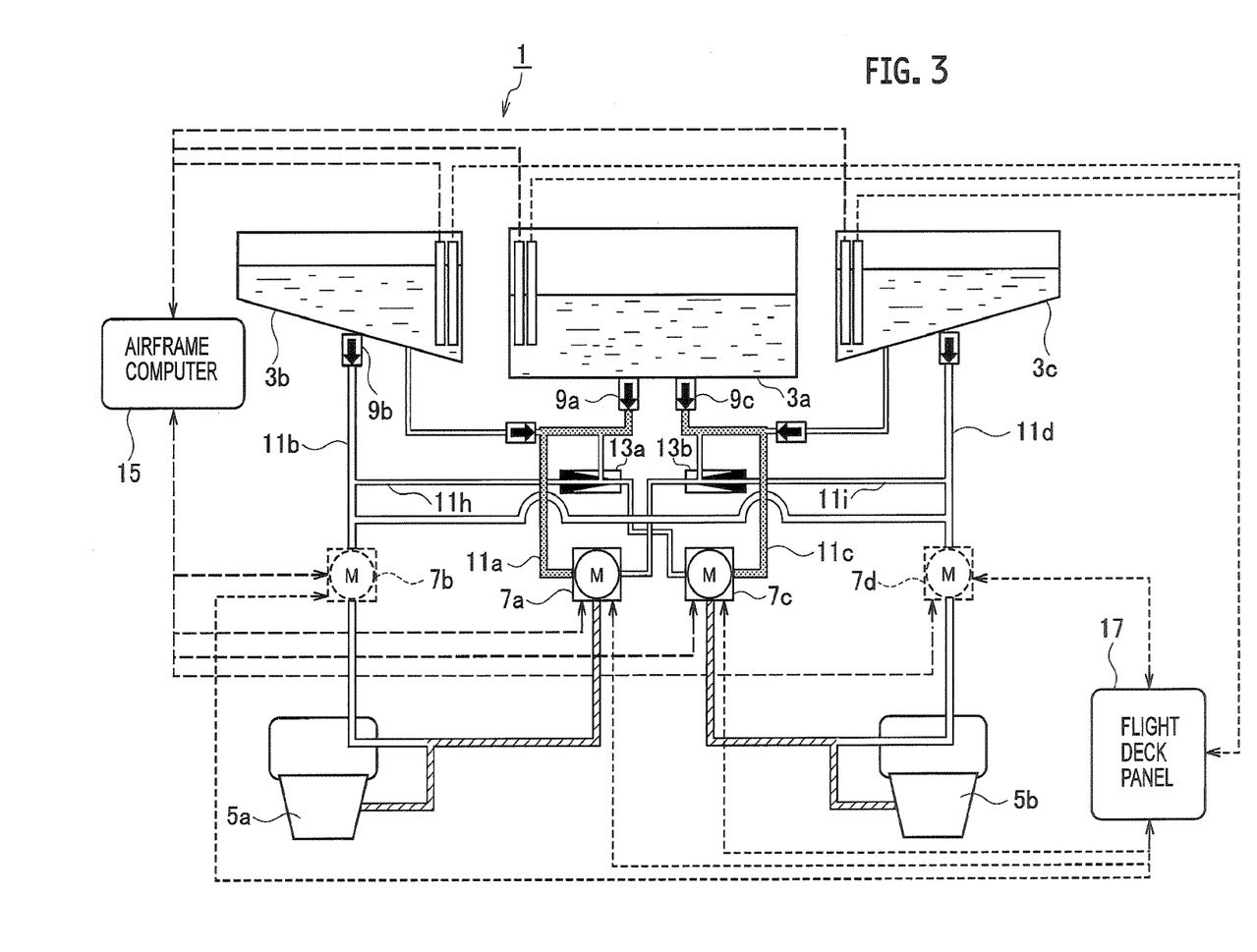
FIG. 3 is an explanatory diagram showing usual supply paths in supplying fuel from a fuselage fuel tank of FIG. 1 to engines in both wings.

In addition, after the takeoff when fuel consumption by the engines 5a and 5b in the both wings decreases, the first and third pump units 7a and 7c described by continuous lines are turned on, and the second and fourth pump units 7b and 7d described by broken lines are turned off, while fuel remains in the fuselage fuel tank 3a, as shown in an explanatory diagram of FIG. 3.

Accordingly, the fuel taken in from the fuselage fuel tank 3a through the left central fuel flow passage 11a by the first pump unit 7a is supplied to the left-wing engine 5a. Meanwhile, the fuel taken in from the fuselage fuel tank 3a through the right central fuel flow passage 11c by the third pump unit 7c is supplied to the right-wing engine 5b.

At this time, a boost pressure of the fuel generated in the low-pressure pump 21 (refer to FIG. 2) of the third pump unit 7c is applied to the supply port of the first ejector pump 13a. In addition, a boost pressure of the fuel generated in the low-pressure pump 21 (refer to FIG. 2) of the first pump unit 7a is applied to the supply port of the second ejector pump 13b.

Meanwhile, in the right and left main fuel flow passages 11b and 11d connected to the discharge ports of the first and second ejector pumps 13a and 13b through the left transfer flow passage 11h and the right transfer flow passage 11i, flow of the fuel is blocked by turning-off of the second and fourth pump units 7b and 7d.

For this reason, the fuel of the fuselage fuel tank 3a connected to the suction ports of the first and second ejector pumps 13a and 13b is not supplied to the right main fuel flow passage 11d and the left main fuel flow passage 11b by the first and second ejector pumps 13a and 13b in which the boost pressures of the fuel have been applied to their supply ports from the third and first pump units 7c and 7a.

Figure 4:
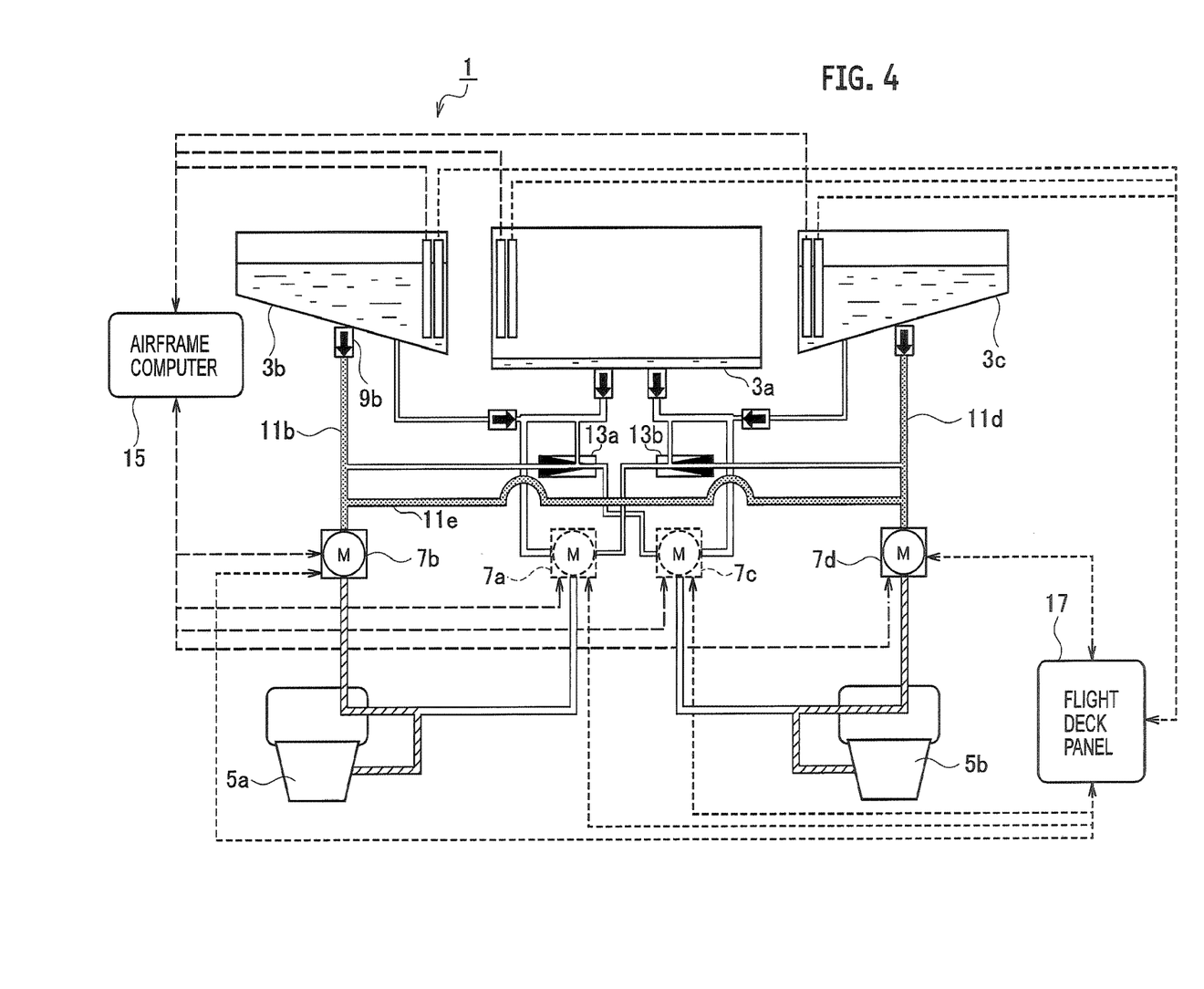
FIG. 4 is an explanatory diagram showing usual supply paths in supplying fuel from fuel tanks in the both wings of FIG. 1 to the engines in the both wings.

Subsequently, when the fuselage fuel tank 3a becomes empty after the takeoff, the second and fourth pump units 7b and 7d described by continuous lines are turned on, and the first and third pump units 7a and 7c described by broken lines are turned off, as shown in an explanatory diagram of FIG. 4.

Accordingly, the fuel taken in from the fuel tanks 3b and 3c in the both wings through the right and left main fuel flow passages 11b and 11d and the central communication flow passage 11e by the second pump unit 7b and the fourth pump unit 7d is supplied to the engines 5a and 5b in the both wings, respectively.

Figure 5:
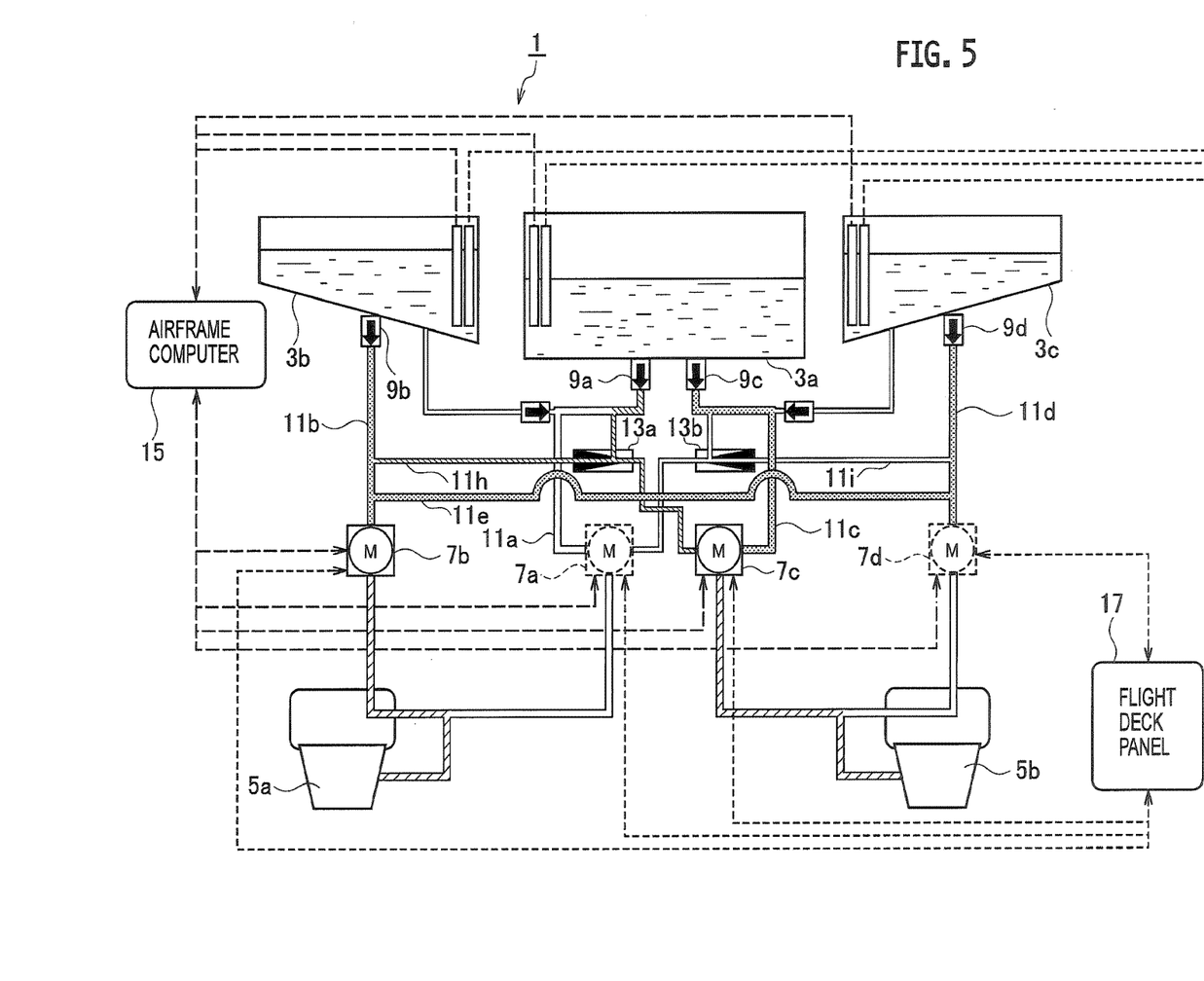
FIG. 5 is an explanatory diagram showing fuel supply paths at the time of failure of a first pump unit that supplies fuel from the fuselage fuel tank of FIG. 1 to a left-wing engine.

By the way, for example, when the first pump unit 7a breaks down in a state where the fuel remains in the fuselage fuel tank 3a, the fuel cannot be supplied from the fuselage fuel tank 3a to the left-wing engine 5a through the left central fuel flow passage 11a.

In this case, the second pump unit 7b is turned on instead of the first pump unit 7a as shown in an explanatory diagram of FIG. 5. As a result of this, the second pump unit 7b supplies to the left-wing engine 5a the fuel taken in from the fuel tanks 3b and 3c in the both wings through the right and left main fuel flow passages 11b and 11d and the central communication flow passage 11e.

At this time, the fuel taken in from the fuselage fuel tank 3a through the right central fuel flow passage 11c by the third pump unit 7c has been supplied to the right-wing engine 5b. Consequently, the boost pressure of the fuel generated in the low-pressure pump 21 (refer to FIG. 2) of the third pump unit 7c is applied to the supply port of the first ejector pump 13a.

Meanwhile, flow of the fuel has been generated in the left main fuel flow-passage 11b by turning-on of the second pump unit 7b. For this reason, the fuel of the fuselage fuel tank 3a connected to the suction port of the first ejector pump 13a is supplied to the left main fuel flow passage 11b through the left transfer flow passage 11h by the first ejector pump 13a in which the boost pressure of the fuel has been applied to its supply port from the third pump unit 7c.

The fuel of the fuselage fuel tank 3a supplied to the left main fuel flow passage 11b by the first ejector pump 13a is supplied to the left-wing engine 5a by the second pump unit 7b together with the fuel taken in from the fuel tanks 3b and 3c in the both wings.

Note that, for example, when the third pump unit 7c breaks down in the state where the fuel remains in the fuselage fuel tank 3a, and the fuel cannot be supplied from the fuselage fuel tank 3a to the right-wing engine 5b through the right central fuel flow passage 11c, the fourth pump unit 7d is turned on instead of the third pump unit 7c.

As a result of this, the fourth pump unit 7d supplies to the right-wing engine 5b the fuel taken in from the fuel tanks 3b and 3c in the both wings through the right and left main fuel flow passages 11b and 11d and the central communication flow passage 11e.

At this time, the first pump unit 7a has been turned on in order to supply the fuel of the fuselage fuel tank 3a to the left-wing engine 5a. Accordingly, the boost pressure of the fuel generated in the low-pressure pump 21 (refer to FIG. 2) of the first pump unit 7a is applied to the supply port of the second ejector pump 13b. In addition, flow of the fuel has been generated in the right main fuel flow passage 11d by turning-on of the fourth pump unit 7d.

For this reason, the fuel of the fuselage fuel tank 3a connected to the suction port of the second ejector pump 13b through the right central fuel flow passage 11c is supplied to the right main fuel flow passage 11d through the right transfer flow passage 11i by the second ejector pump 13b in which the boost pressure of the fuel has been applied to its supply port from the first pump unit 7a.

The fuel of the fuselage fuel tank 3a supplied to the right main fuel flow passage 11d by the second ejector pump 13b is supplied to the right-wing engine 5b by the fourth pump unit 7d together with the fuel taken in from the fuel tanks 3b and 3c in the both wings.

As described above, even though the first pump unit 7a and the third pump unit 7c break down in the state where the fuel remains in the fuselage fuel tank 3a, supply of the fuel to the left-wing engine 5a and the right-wing engine 5b can be continued by using the second pump unit 7b and the fourth pump unit 7d instead of them.

In addition, remaining fuel of the fuselage fuel tank 3a is supplied to the left-wing engine 5a and the right-wing engine 5b together using the first ejector pump 13a and the second ejector pump 13b, and thereby a reduction of a fuel supply amount of the fuselage fuel tank 3a to the left-wing engine 5a and the right-wing engine 5b, which is due to failure of the first pump unit 7a and the third pump unit 7c, can be mitigated. As a result of this, the fuel of the fuselage fuel tank 3a can be continued to be consumed in priority to the fuel of the fuel tanks 3b and 3c in the both wings.

Figure 6:
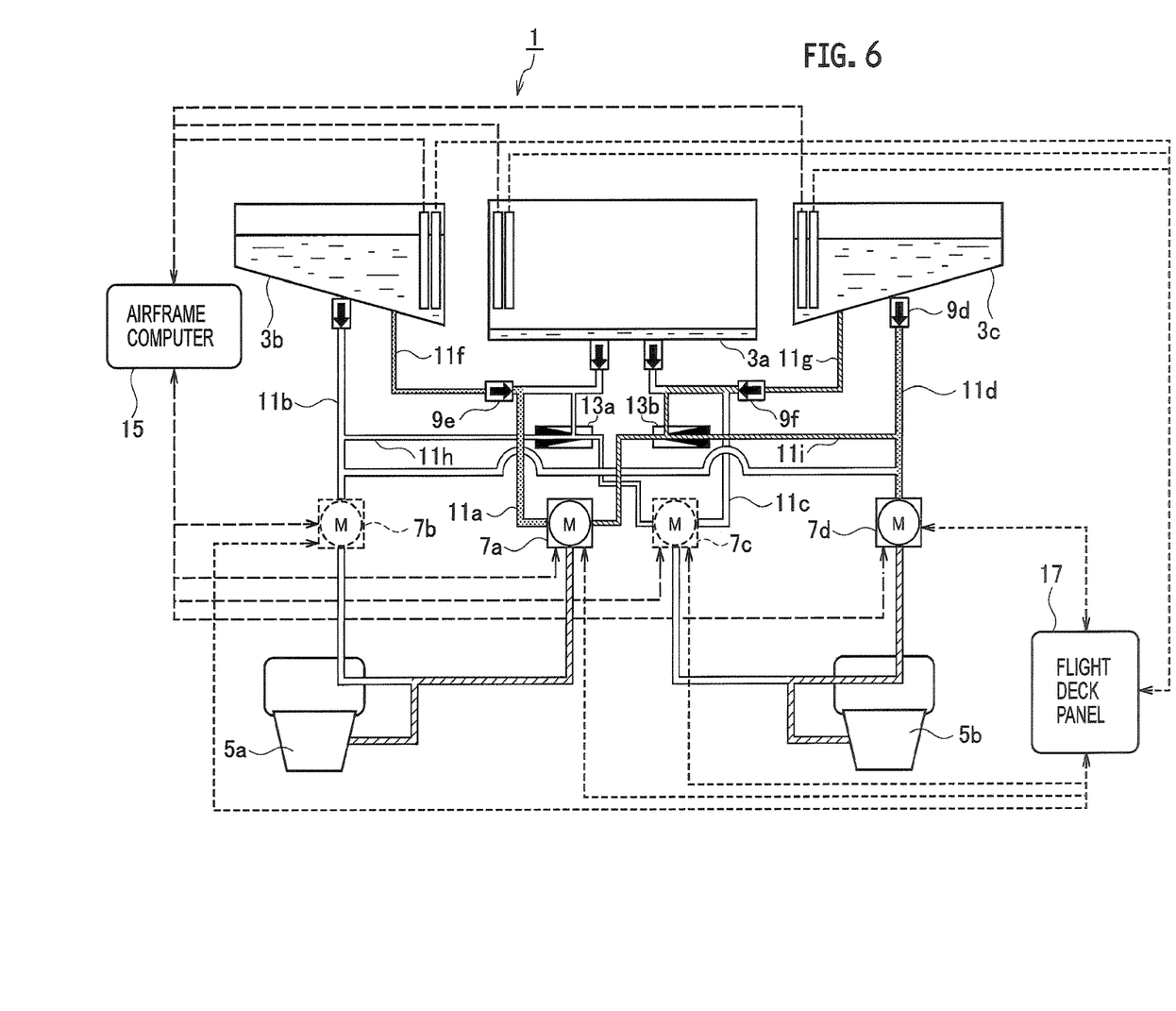
FIG. 6 is an explanatory diagram showing fuel supply paths at the time of failure of a second pump unit that supplies fuel from the fuel tanks in the both wings of FIG. 1 to the left-wing engine.

Next, for example, when the second pump unit 7b breaks down in a state where the fuselage fuel tank 3a is empty, fuel cannot be supplied from the fuel tanks 3b and 3c in the both wings to the left-wing engine 5a through the left main fuel flow passage 11b.

In this case, the first pump unit 7a is turned on instead of the second pump unit 7b as shown in an explanatory diagram of FIG. 6. In that case, since the fuselage fuel tank 3a is already empty, fuel is supplied from the left-wing fuel tank 3b to the first pump unit 7a through the check valve 9e and the left communication flow passage 11f with higher pressure losses than the left central fuel flow passage 11a. The first pump unit 7a then supplies to the left-wing engine 5a the fuel taken in from the left-wing fuel tank 3b.

At this time, the boost pressure of the fuel generated in the low-pressure pump 21 (refer to FIG. 2) of the first pump unit 7a is applied to the supply port of the second ejector pump 13b. In addition, the flow of the fuel has been generated in the right main fuel flow passage 11d by turning-on of the fourth pump unit 7d. However, the fuselage fuel tank 3a connected to the suction port of the second ejector pump 13b through the right central fuel flow passage 11c is empty.

For this reason, the fuel of the right-wing fuel tank 3c is supplied to the suction port of the second ejector pump 13b through the check valve 9f and the right communication flow passage 11g with higher pressure losses than the right central fuel flow passage 11c. Accordingly, the fuel from the right-wing fuel tank 3c is supplied to the right main fuel flow passage 11d through the right transfer flow passage 11i by the second ejector pump 13b in which the boost pressure of the fuel has been applied to its supply port from the first pump unit 7a.

The fuel of the right-wing fuel tank 3c supplied to the right main fuel flow passage 11d by the second ejector pump 13b is supplied to the right-wing engine 5b by the fourth pump unit 7d together with the fuel directly taken in from the right-wing fuel tank 3c through the right main fuel flow passage 11d.

At this time, since a supply amount of the fuel is measured by the measuring unit 30 (refer to FIG. 2) of the fourth pump unit 7d, fuel is not excessively supplied to the right-wing engine 5b, even though the fuel from the right-wing fuel tank 3c supplied by the second ejector pump 13b is supplied to the right-wing engine 5b together.

Note that, for example, when the fourth pump unit 7d breaks down in the state where the fuselage fuel tank 3a is empty, and the fuel cannot be supplied from the fuel tanks 3b and 3c in the both wings to the right-wing engine 5b through the right main fuel flow passage 11d, the third pump unit 7c is turned on instead of the fourth pump unit 7d.

As a result of this, the third pump unit 7c supplies to the right-wing engine 5b the fuel taken in from the right-wing fuel tank 3c through the check valve 9f and the right communication flow passage 11g with the higher pressure losses than the right central fuel flow passage 11c.

At this time, the third pump unit 7c has been turned on in order to supply the fuel of the fuselage fuel tank 3a to the right-wing engine 5b. Accordingly, the boost pressure of the fuel generated in the low-pressure pump 21 (refer to FIG. 2) of the third pump unit 7c is applied to the supply port of the first ejector pump 13a. In addition, the flow of the fuel has been generated in the left main fuel flow passage 11b by turning-on of the first pump unit 7a. However, the fuselage fuel tank 3a connected to the suction port of the first ejector pump 13a through the left central fuel flow passage 11a is empty.

For this reason, the fuel of the left-wing fuel tank 3b is supplied to the suction port of the first ejector pump 13a through the check valve 9e and the left communication flow passage 11f with the higher pressure losses than the left central fuel flow passage 11a. Accordingly, the fuel from the left-wing fuel tank 3b is supplied to the left main fuel flow passage 11b through the left transfer flow passage 11h by the first ejector pump 13a in which the boost pressure of the fuel has been applied to its supply port from the third pump unit 7c.

The fuel of the left-wing fuel tank 3b supplied to the left main fuel flow passage 11b by the first ejector pump 13a is supplied to the left-wing engine 5a by the second pump unit 7b together with the fuel directly taken in from the left-wing fuel tank 3b through the left main fuel flow passage 11b.

At this time, since a supply amount of the fuel is measured by the measuring unit 30 (refer to FIG. 2) of the second pump unit 7b, fuel is not excessively supplied to the left-wing engine 5a, even though the fuel from the left-wing fuel tank 3b supplied by the first ejector pump 13a is supplied to the left-wing engine 5a together.

As described above, even though the second pump unit 7b and the fourth pump unit 7d break down in the state where the fuselage fuel tank 3a is empty, supply of the fuel to the left-wing engine 5a and the right-wing engine 5b can be continued by using the first pump unit 7a and the third pump unit 7c instead of them.

As explained above, according to the fuel supply apparatus 1 of the embodiment, two systems of the first pump unit 7a and the third pump unit 7c that supply the fuel of the fuselage fuel tank 3a, and the second pump unit 7b and the fourth pump unit 7d that supply the fuel of the fuel tanks 3b and 3c in the both right and left wings are provided corresponding to the left-wing engine 5a and the right-wing engine 5b, respectively.

Namely, when the first pump unit 7a is selected as the pump unit that supplies fuel to the left-wing engine 5a, the fuel from the fuselage fuel tank 3a is supplied to the left-wing engine 5a by the first pump unit 7a. Meanwhile, when the second pump unit 7b is selected as the pump unit that supplies fuel to the left-wing engine 5a, the fuel from the fuel tanks 3b and 3c in the both wings is supplied to the left-wing engine 5a by the second pump unit 7b.

In addition, when the third pump unit 7c is selected as the pump unit that supplies fuel to the right-wing engine 5b, the fuel from the fuselage fuel tank 3a is supplied to the right-wing engine 5b by the third pump unit 7c. Meanwhile, when the fourth pump unit 7d is selected as the pump unit that supplies fuel to the right-wing engine 5b, the fuel from the fuel tanks 3b and 3c in the both wings is supplied to the right-wing engine 5b by the fourth pump unit 7d.

For this reason, a supply source of the fuel to be supplied to the left-wing engine 5a and the right-wing engine 5b can be switched by switching of the pump units to be turned on. That is, when the pump units used for fuel supply to the engines 5a and 5b are switched from the first pump unit 7a and the third pump unit 7c to the second pump unit 7b and the fourth pump unit 7d, fuel consumed in the engines 5a and 5b is switched from the fuel of the fuselage fuel tank 3a to the fuel of the fuel tanks 3b and 3c in the both wings. In addition to that, since the second pump unit 7b and the fourth pump unit 7d supply the fuel of the fuel tanks 3b and 3c in the both wings to the engines 5a and 5b, the fuel of the fuel tanks 3b and 3c in the both wings is equally consumed in the engines 5a and 5b, and the fuel of the fuel tanks 3b and 3c of one of the wings is not consumed unevenly in the engines 5a and 5b. Accordingly, it can be achieved by simple configuration and operation to consume the fuel of the fuel tanks 3a to 3c in the fuselage and the both wings in order, and to equalize amounts of fuel consumption of the fuel tanks 3b and 3c in the both wings.

In addition, at the time of failure of the first pump unit 7a or the third pump unit 7c, the fuel of the left-wing fuel tank 3b or the right-wing fuel tank 3c can be supplied to the left-wing engine 5a or the right-wing engine 5b instead of the fuel of the fuselage fuel tank 3a by the second pump unit 7b and the fourth pump unit 7d.

Note that a configuration may be omitted in which the fuel of the fuselage fuel tank 3a can be supplied to the left-wing engine 5a or the right-wing engine 5b by the first ejector pump 13a and the second ejector pump 13b at the time of failure of the first pump unit 7a or the third pump unit 7c.

However, if the configuration is provided, the fuel of the fuselage fuel tank 3a can be continued to be consumed in priority to the fuel of the fuel tanks 3b and 3c in the both wings, even though the first pump unit 7a or the third pump unit 7c breaks down. For example, when the fuel of the fuselage fuel tank 3a cannot be supplied to the engines 5a and 5b because of the stop of the first pump unit 7a or the third pump unit 7c due to failure etc., and switching is performed so that fuel is supplied from the fuel tanks 3b and 3c in the both wings to the engines 5a and 5b, fuel consumption of the fuselage fuel tank 3a decreases as much as a fuel amount that is not supplied to the engines 5a and 5b. In that case, order of consuming the fuel is changed between the fuselage fuel tank 3a, and the fuel tanks 3b and 3c in the both wings, and depending on the case, a state occurs where the fuel tanks 3b and 3c in the both wings first become empty, and where the fuel remains in the fuselage fuel tank 3a.

In contrast with this, in a case where the first ejector pump 13a and the second ejector pump 13b are provided, for example, when the first pump unit 7a stops, and the pump unit that supplies fuel to the left-wing engine 5a is switched to the second pump unit 7b, the fuel of the fuselage fuel tank 3a is supplied to the left-wing engine 5a by the second pump unit 7b using the first ejector pump 13a, if the third pump unit 7c has not stopped.

Similarly, for example, when the third pump unit 7c stops, and the pump unit that supplies fuel to the right-wing engine 5b is switched to the fourth pump unit 7d, the fuel of the fuselage fuel tank 3a is supplied to the right-wing engine 5b by the fourth pump unit 7d using the second ejector pump 13b, if the first pump unit 7a has not stopped.

For this reason, the engine 5a (or 5b) in which the fuel supply source has been switched to the fuel tanks 3b and 3c in the both wings due to the stop of the pump unit is made to continue to consume the fuel of the fuselage fuel tank 3a in the state where the fuel remains in the fuselage fuel tank 3a, and thereby change of the order of consuming the fuel between the fuselage fuel tank 3a, and the fuel tanks 3b and 3c in the both wings can be suppressed.

Additionally, the present disclosure can be widely applied to an aircraft that supplies fuel to an engine as a propulsion device regardless of a military aircraft or a civil aircraft, or regardless of a passenger aircraft or a cargo aircraft.

What is claimed is:

1. A fuel supply apparatus for an aircraft, the apparatus comprising:
   a first pump unit configured to supply fuel from a fuselage fuel tank of the aircraft to a first engine provided in a left wing of the aircraft;
   a second pump unit configured to supply fuel from fuel tanks in both wings of the aircraft to the first engine;
   a third pump unit configured to supply the fuel from the fuselage fuel tank to a second engine provided in a right wing of the aircraft;
   a fourth pump unit configured to supply the fuel from the fuel tanks in the both wings to the second engine; and
   a computer configured to selectively switch the pump units that supply the fuel to each engine, respectively, wherein
   each pump unit has a booster and a measuring unit;
   the booster includes:
      a centrifugal pump and a gear pump configured to boost and supply fuel to a corresponding engine of the first engine and the second engine, and
      an electric motor configured to rotationally drives the centrifugal pump and the gear pump; and
   the measuring unit is configured to measure a supply amount of the fuel to the corresponding engine.

2. The fuel supply apparatus according to claim 1, further comprising:
   a first ejector pump including:
      a suction port connected to the fuselage fuel tank,
      a supply port connected to an outlet of the centrifugal pump in the third pump unit, and
      a discharge port connected to a first fuel supply path from the fuel tanks in the both wings to the second pump unit,
   the first ejector pump being configured to supply fuel from the fuselage fuel tank to the first fuel supply path, when the fuel is supplied from the second pump unit to the first engine, and the fuel is supplied from the third pump unit to the second engine; and
   a second ejector pump including:
      a suction port connected to the fuselage fuel tank,
      a supply port connected to an outlet of the centrifugal pump in the first pump unit, and a discharge port connected to a second fuel supply path from the fuel tanks in the both wings to the fourth pump unit, the second ejector pump being configured to supply fuel from the fuselage fuel tank to the second fuel supply path from the fuel tanks in the both wings to the fourth pump unit, when the fuel is supplied from the fourth pump unit to the second engine, and the fuel is supplied from the first pump unit to the first engine.

3. The fuel supply apparatus according to claim 1, wherein the measuring unit includes:

a fixed orifice, a pressurizing valve provided in parallel to the fixed orifice, and a differential pressure gauge which measures a differential pressure between an upstream side and a downstream side of a parallel flow passage of the fixed orifice and the pressurizing valve.

\* \* \* \* \*